United States Patent [19]

Holzrichter et al.

[11] Patent Number: 4,520,188

[45] Date of Patent: May 28, 1985

[54] POLYESTER-FORMING COMPOSITION FOR COIL COATINGS, IMPROVED POLYESTER RESIN AND METHOD OF MAKING SAME

[75] Inventors: Edward J. Holzrichter, Redlands; Marc L. Smith, Highland, both of Calif.

[73] Assignee: Whittaker Corporation, Los Angeles, Calif.

[21] Appl. No.: 650,156

[22] Filed: Sep. 13, 1984

[51] Int. Cl.³ .................. C08G 63/04; C08G 63/22
[52] U.S. Cl. .................. 528/274; 528/283; 528/302; 528/305; 528/308.7
[58] Field of Search ............. 528/274, 283, 302, 305, 528/308.7

[56] References Cited

U.S. PATENT DOCUMENTS

| | | | |
|---|---|---|---|
| 4,065,439 | 12/1977 | Uno et al. | 528/302 |
| 4,229,555 | 10/1980 | Tobias et al. | 525/443 |
| 4,275,189 | 6/1981 | Danick et al. | 528/296 |
| 4,387,214 | 6/1983 | Passmore et al. | 528/296 |
| 4,393,121 | 7/1983 | Tobias et al. | 528/302 X |

*Primary Examiner*—Lucille M. Phynes
*Attorney, Agent, or Firm*—Donald E. Nist

[57] ABSTRACT

The improved composition comprises: about 43–31 mole % of neopentyl glycol; about 10–21 mole % of 1,4-cyclohexanedimethanol; about 10–21 mole % of aliphatic dicarboxylic acid selected from the group consisting of adipic acid, sebacic acid, azelaic acid, 1,12-dodecanedioic acid and mixtures thereof; about 22–16 mole % of aromatic acid selected from the group consisting of orthophthalic acid, isophthalic acid and mixture thereof; about 15–11 mole % of terephthalic acid; and, sufficient condensation catalyst to effect substantial esterification and polymerization of said composition at elevated temperature. The catalyst may be, for example, dibutyl tin oxide. The mole ratio of alcohol to acid is about 1.08–1, 13:1. The polyester resin is provided by reacting the components of the composition at a temperature of, for example, 470° F. for a time sufficient to complete the reaction, the resin having an average molecular weight of at least about 5000 and preferably about 5000–7000. The resin is then cooled, diluted with hydrocarbon solvent and reacted with melamine resin or the like in the presence of a cross-linking agent to provide an improved coil coating. The coil coating when cured as a film on a coil substrate exhibits superior hardness, bend flexibility and resistance to solvent degradation. The liquid coating also resists crystallization in storage and the polyester resin thereof is more readily soluble in common organic solvents.

13 Claims, No Drawings

POLYESTER-FORMING COMPOSITION FOR COIL COATINGS, IMPROVED POLYESTER RESIN AND METHOD OF MAKING SAME

BACKGROUND OF THE INVENTION

1. Field of the Invention

The present invention generally relates to resins and more particularly to an improved polyester resin for coil coatings and a method of making the same.

2. Prior Art

Modern liquid coatings for application to metallic coil substrates conventionally include linear polyester resin which has been cross-linked with melamine or a similar resin and imparts to the cured film provided by the coating the desired hardness and solvent resistance. Such polyester resins are preferably obtained by reacting di-functional acids and alcohols together. Terephthalic acid has been the aromatic di-functional acid of choice in preparing such polyester resins because it lends to the ultimate cured film improved hardness and greater damage resistance than other aromatic di-functional acids at equivalent levels of flexibility. Unfortunately, terephthalic acid has two major disadvantages. In this regard, it tends to impair the solubility of the polyester resin in common organic solvents. It also causes the resin to crystallize out of solution in a relatively short period of time. Consequently, conventional polyester resins prepared for use in coil coating compositions have been a compromise at best, with notable deficiencies.

Accordingly, there remains a need for an improved polyester resin which overcomes the foregoing deficiencies. Thus, it should impart to the finished cured coil coating film improved hardness and damage resistance but also improved bend flexibility, without a tendency to crystallize from solution. The resin should be easily soluble in common organic solvents.

SUMMARY OF THE INVENTION

The improved polyester resin of the present invention satisfies all of the foregoing needs. The resin is provided by reacting the components of the improved polyester-forming composition of the present invention under esterification and polymerization conditions to produce a linear polyester resin having an average molecular weight of at least about 5000 and preferably about 5000–7000. The improved polyester-forming composition is substantially as set forth in the Abstract above. Thus, it employs neopentyl glycol along with a cyclic polyhydroxy alcohol in the form of 1,4-cyclohexanedimethanol. The acid portion of the composition comprises terephthalic acid, along with orthophthalic or isophthalic acid or a mixture of those two acids, and with a substantial portion of the composition in the form of aliphatic dicarboxylic acid selected from the group consisting of adipic acid, sebacic acid, azelaic acid, dodecanedioic acid or a mixture thereof. The particular ranges of concentrations of constituents are specified in the Abstract. Thus, the composition is in part characterized by the use of the cyclo-aliphatic alcohol which in turn permits the concentration of terephthalic acid to be lowered and partially replaced by aliphatic dicarboxylic acid, without reducing the improved hardness, bend flexibility and damage resistance imparted to a coil coating by the terephthalic acid. The net result is a coil coating which resists crystallization and the polyester resin portion of which is more readily soluble in common organic solvents. Accordingly, the coil coating composition has improved utility. Further features of the present invention are set forth in the following detailed description.

DETAILED DESCRIPTION

The improved polyester-forming composition of the present invention comprises the following components: about 43–31 mole % of neopentyl glycol; about 10–21 mole % of 1,4-cyclohexanedimethanol; about 10–21 mole % of aliphatic dicarboxylic acid selected from the group consisting of adipic acid, sebacic acid, azelaic acid, 1,12-dodecanedioic acid and mixtures thereof; about 22–16 mole % of aromatic acid selected from the group consisting of orthophthalic acid, isophthalic acid and mixtures thereof; about 15–11 mole % of terephthalic acid; and, sufficient condensation catalyst to effect substantial esterification and polymerization of said composition at elevated temperature.

It has been found that at least about 10 mole % of the cyclohexanedimethanol should be present in the composition in order to reduce the necessary level of terephthalic acid sufficiently to avoid crystallization of the resulting resin from solution in a coil coating composition. However, the mole % of the cyclohexanedimethanol should not substantially exceed about 21 mole % because above that level substantial decreases in solubility of the polyester resin in common organic solvents occur. It will be noted that the total mole % of the alcohol in the composition is about 52–53 mole %, with the total concentration of the acid about 47–48 mole % so that the mole ratio of alcohol to acid is about 1.08–1.13:1. This mole ratio is controlled by carefully heating the composition in bringing it to esterification and polymerization temperature, so that the final desired viscosity is obtained for the resin, and the molecular weight will be in the desired range of about 5000–7000. The excess of alcohol to acid is also necessary in order to drive the esterification and polymerization reactions to completion.

About 15–11 mole % of terephthalic acid is used in the composition. The terephthalic acid contributes hardness to the finished cured coil coating film. If no terephthalic acid is present, the hardness may be as soft as HB pencil hardness while the hardness increases as the terephthalic acid concentration increases to a level where at 11 mole % the pencil hardness is F, a superior hardness for coil coating pruposes. However, when the mole % of terephthalic acid increases to about 15%, the polyester resin becomes unstable and tends to crystallize during aging. Levels well above 15% of terephthalic acid result in crystallization of the polyester resin solution which cannot be cleared up by the addition of solvents.

Because of the presence of the cyclo-aliphatic alcohol in the composition, aliphatic dicarboxylic acid selected from the group consisting of the adipic acid, sebacic acid, azelaic acid, 1,12-dodecanedioic acid and mixtures thereof can be substituted for the terephthalic acid to the extent of about 10–21 mole % of the composition. The acid portion of the composition also includes about 16–22 mole % of orthophthalic acid, isophthalic acid or a mixture thereof. The desired F pencil hardness is obtained in coil coatings employing the polyester resin formed by this composition, along with zero T bend flexibility resistance to crystallization from solution and good solubility in common organic solvents. Accordingly, superior coil coatings are provided from the polyester resin formed from this composition. The composition contains sufficient condensation catalyst, for example, about 1.2 grams of dibutyl tin oxide per 2400-2500 grams of alcohol and acid to effect the desired esterification and polymerization of the composition at reaction temperature, for example, 450°-480° F.

A preferred embodiment of the composition includes neopentyl glycol, 1,4-cyclohexanedimethanol as the cyclo-aliphatic alcohol, adipic acid, isophthalic acid, terephthalic acid and dibutytin oxide.

In a typical reaction, the polyester-forming composition is placed in a flask with an agitator, condenser and distillation receiver, thermometer and connected to an inert gas inlet, and is then heated in inert gas to reaction termperature of about 450°-470° F. at a slow enough rate to control the alcohol loss to achieve the final desired viscosity. For example, the charge may be heated over a 330 minute period from room temperature to 470° F. The condensation reaction is carried to completion at the reaction temperature, for example, in about 350 minutes and the thus formed polyester resin is then cooled and mixed with aromatic hydrocarbon solvent to form a resin solution.

A coil coating composition is made from the polyester resin solution typically by dispersing in it a desired concentration of pigment filler such as titanium dioxide, additional aromatic hydrocarbon solvent, melamine resin in a sufficient amount to cross-link the linear polyester resin and a cross-linking catalyst such as p-toluene sulfonic acid. A leveling agent such as an acrylic flow modifying resin may also be added.

This coating composition can then be spread as a thin film on a metal coil substrate, for example, steel, copper, aluminum or the like to typically provide, when cured, a film thickness of about 0.3-1.2 mils. The coating is cured by cross-linking, typically at about 350 to about 600° F. It can then be tested for solvent resistance, pencil hardness, bend flexibility and the like. The following specific Examples illustrate certain features of the present invention.

EXAMPLE I

The composition of Table I below was passed into a flask equipped with an agitator, a condenser, a distillation receiver, a thermometer and an inert gas inlet (nitrogen):

TABLE I

| Ingredients | Grams | Moles |
|---|---|---|
| Neopentyl Glycol | 730.1 | 7.02 |
| 1,4-Cyclohexanedimethanol | 337.0 | 2.34 |
| Adipic Acid | 417.6 | 2.86 |
| Isophthalic Acid | 547.8 | 3.30 |
| Terephthalic Acid | 365.2 | 2.20 |
| Dibutyl Tin Oxide | 1.2 | — |

The above charge was heated to 470° F. from room temperature over a period of 330 minutes and then maintained at 470° F. for 350 minutes until the condensation reaction was completed. At that point the resulting polyester resin had a viscosity of T at 50% solids in ethoxyethanol acetate and an acid value of 9.9.

The resin was then cooled to 400° F. after which 545.3 grams of 150° F. flash aromatic hydrocarbon solvent was added, followed by 818 grams of 100° F. flash aromatic hydrocarbon solvent. The resulting resin solution had a solids content of 59.7 weight %, an acid value of 8.6, a viscosity of Z1-Z2 (Gardner Bubble) a color of Gardner 1 and a molecular weight of 6200 (number average), the average molecular weight having been determined by gel permeation chromatography.

A coil coating composition was prepared from the polyester resin by dispersing 159.4 grams of titanium dioxide in 279 grams of the polyester resin solution specified above, along with 34.2 grams of 150° F. flash aromatic hydrocarbon solvent and 59.6 grams of ethoxyethanol acetate. 72.3 grams of this dispersion were then combined with 3.1 grams of methylated melamine resin, 0.2 grams of a 20% by weight solution of p-toluene sulfonic acid and 2 drops of an acrylic flow modifying resin. The resulting mixture was applied as a thin film on an aluminum coil substrate and cured at approximately 500° F. for 30 seconds to form a cross-linked film.

The dried film was then tested by rubbing it in two directions 100 times each with a cloth saturated with methyl ethyl ketone. The dried film resisted degradation for the total length of this test. The film was also found to have an F pencil hardness and zero T bend flexibility. The zero T flexibility test was carried out by bending the film-coated substrate back upon itself so that no space remained between the two bent layers of substrate. The film adhered to the substrate without cracking. The zero T bent film was then immersed for two minutes in boiling water, and then removed and examined and was found to remain intact on the substrate without cracking. Accordingly, the film was a superior coil coating. The coating composition was also tested by allowing it to stand in storage at room temperature for a period of 12 months, during which time it did not show any tendency to crystallize.

EXAMPLE II

A polyester resin having an average molecular weight of approximatley 3000 but utilizing the same constituents as specified in Example I was formed with the proportions of constituent as specified in Table II bleow.

TABLE II

| Ingredients | Grams | Moles |
|---|---|---|
| Neopentyl Glycol | 672.6 | 6.47 |
| 1,4-Cyclohexanedimethanol | 311.1 | 2.16 |
| Adipic Acid | 371.2 | 2.54 |
| Isophthalic Acid | 487.0 | 2.93 |
| Terephthalic Acid | 324.6 | 1.96 |
| Dybutytin Oxide | 1.1 | — |

The components of Table II were heated as in Example I and held at 470° F. for about 300 minutes until a viscosity of M at 60 weight % solids in xylene and an acid value of 6.3 were obtained. The resulting polyester resin was reduced to a concentration of 64.1 weight % solids by addition of a solvent blend consisting of 40 weight % 150° F. flash aromatic hydrocarbon solvent and 60 weight % 100° F. flash aromatic hydrocarbon solvent. The viscosity of this solution was X-Y. The average molecular weight of the polyester resin was about 3000.

A coil coating composition was prepared from the polyester resin solution in a manner identical to that of Example I utilizing the same concentrations of the same ingredients.

The resulting coil coating composition was then coated on an aluminum substrate to the same thickness as in Example I, cured at the same temperature and tested in the same manner. It was found to fracture on a zero T bend and was also found to fracture on a one T bend after immersion in boiling water for two minutes. The lower molecular weight polymer had a linear length substantially less than that of the polymer of Example I and when cross-linked with melamine resulted in a higher cross-link density which substantially reduced its flexibility. The pencil hardness was F and no crystallization occurred for the coating composition during storage. It will be noted that the mole ratio of alcohol to acid was 1.16:1 whereas the mole ratio of alcohol to acid in Example I was 1.12:1. The substantial increase in the hydroxyl to acid ratio in the polyester resin of Example II resulted in it having a substantially lower molecular weight than the polyester resin of Example I and inferior properties

EXAMPLE III

A polyester resin was prepared utilizing the constituents set forth in Table III below.

TABLE III

| Ingredients | Grams | Moles |
| --- | --- | --- |
| Neopentyl Glycol | 730.1 | 7.02 |
| 1,4-Cyclohexanedimethanol | 337.0 | 2.34 |
| Adipic Acid | 146.0 | 1.00 |
| Isophthalic Acid | 733.7 | 4.42 |
| Terephthalic Acid | 488.0 | 2.94 |
| Dibutyl tin Oxide | 1.2 | |

The constituents listed in Table III above were heated as in Example I in the reaction vessel described in Example I except that the reaction temperature was 460° F. The reaction temperature was maintained for a period of 450 minutes, at the end of which time the polyester resin had a viscosity of S at 50% by weight solids in ethoxyethanol acetate and an acid value of 9.4. The resin was diluted to 60.6 weight % solids in the solvent blend described in Example II so that the resulting resin solution had a viscosity of Z2 and a Gardner color of less than 1. The polyester resin had an average molecular weight of about 6000.

A coil coating composition was prepared in accordance with the procedure in Example I utilizing the same constituents except for substituting the polyester resin of this Example for that of Example I. The coil coating composition was applied to an aluminum coil substrate in a thickness which when cured was 0.5 mils. This cured film was found to have an F pencil hardness but fractured on a zero T bend after a two minute immersion in boiling water. It thus exhibited impaired flexibility. This was due to the reduction of the adipic acid concentration to below the minimum mole % for the improved composition of the present invention. Thus, the mole % of adipic acid was about 5 mole % instead of the minimum of 10 mole %. Accordingly, the terephthalic acid had to be increased to about 16.6 mole % that is, over the maximum amount which could be tolerated without impairing film bend flexibility and polyester resin solubility. The coating composition also had a tendency to crystallize from solution over a period of 11 months at room temperature.

EXAMPLE IV

The procedure of Example I was carried out utilizing the constituents set forth in Table IV below to form the polyester resin.

TABLE IV

| Ingredients | Grams | Moles |
| --- | --- | --- |
| Neopentyl Glycol | 468.7 | 4.68 |
| 1,4-Cyclohexanedimethanol | 673.9 | 4.68 |
| Adipic Acid | 604.4 | 4.14 |
| Isophthalic Acid | 184.3 | 1.11 |
| Terephthalic Acid | 471.4 | 2.84 |
| Trimellitic Anydride | 34.6 | 0.18 |
| Dibutyl tin Oxide | 1.2 | — |

The reaction temperature for esterification and polymerization to form the polyester resin was 470° F. It was reached over a period of about 300 minutes and that reaction temperature was held for about 180 minutes. The polyester resin was then tested and found to have an acid value of 13.3. It was too insoluble in common organic solvents to be useful in a coil coating composition. The mole ratio of the alcohol to the acid was about 1.16:1. The 1,4-cyclohexanedimethanol was present in a concentration in excess of about 26 mole %, well above the limit of about 21 mole %.

EXAMPLE V

The procedure of Example I was carried out utilizing the constituents in Table V to form the polyester resin.

TABLE V

| Ingredients | Grams | Moles |
| --- | --- | --- |
| Neopentyl Glycol | 575.5 | 5.53 |
| 1,4-Cyclohexanedimethanol | 265.6 | 1.84 |
| 1,12-Dodecanedioic Acid | 363.0 | 1.58 |
| Isophthalic Acid | 499.8 | 3.01 |
| Terephthalic Acid | 332.3 | 2.00 |
| Dibutyltin Oxide | 1.0 | — |

The reaction temperature for esterification was 460°–470° F. It was reached over a period of 430 minutes and held for a period of 330 minutes after which the polyester resin had an acid value of 12.0 and a viscosity of U at 50% solids by weight in ethoxyethanol acetate. The resin was diluted to 59.2 weight % solids in the solvent blend described in Example II. The resulting solution had a viscosity of $Z_1$ and a Gardner color of 1-2. The number average molecular weight of the polymer was about 6500.

A coil coating composition was made and tested as in Example I. The film resisted 100 MEK double rubs, had an F pencil hardness, and did not fracture on the zero-T flexibility test. The zero-T bent film was then immersed in boiling water for two minutes and, when removed, was found to remain intact without fracturing.

EXAMPLE VI

A polyester resin was made according to the methods of Example I using the constituents listed in Table VI.

TABLE VI

| Ingredients | Grams | Moles |
| --- | --- | --- |
| Neopentyl Glycol | 594.6 | 5.72 |
| 1,4-cyclohexanedimethanol | 274.5 | 1.91 |
| Azelaic Acid | 336.8 | 1.79 |
| Isophthalic Acid | 500.2 | 3.01 |
| Terephthalic Acid | 332.6 | 2.00 |
| Dibutyltin Oxide | 1.0 | — |

The above charge was heated to 465° F. over a period of 360 minutes and then maintained at 465° F. for 420 minutes to complete the esterification. At this point the resin had a viscosity of S-T % at 50% weight solids in ethoxythanol acetate and an acid value of 5.3. The resin was then cooled and diluted to 59.1% solids in the solvent blend described in Example II. The resulting solution had a viscosity of X - Y and a Gardner color of 2. The number average molecular weight was about 6000.

A coil coating composition was made and tested as in Example I. The film resisted 100 MEK double rubs, had an F pencil hardness, and did not fracture on the zero-T flexibility test. The zero-T bent film was then immersed in boiling water for two minutes and, when removed, was found to remain intact without fracturing.

The improved polyester-forming composition of the present invention has the alcohol and acid components of the composition in the approximate weight % concentrations listed in Table VII.

TABLE VII

| Ingredients | Wt. - % |
| --- | --- |
| Neopentyl Glycol | 33-24 |
| 1,4-Cyclohexanedimethanol | 11-22 |
| Adipic Acid, Sebacic Acid, Dodecanedioic Acid and/or Azelaic Acid | 11-22 |
| Isophthalic Acid | 27-19 |
| (or Orthphthalic Acid) | (24-17) |
| Terephthalic Acid | 18-13 |

The improved polyester-forming composition, the improved polyester resin obtained by esterifying and polymerizing the composition and the coil coatings made by using the resin and cross-linking it all exhibit improved properties over conventional compositions. The coil coatings when dried have superior bend flexibility, hardness and resistance to solvent and heat degradation, while the liquid coating composition has improved stability, resistance to crystallization and improved solubility of the polyester resin components thereof in common organic solvents. Various other advantages are as set forth in the foregoing.

Various modifications, changes, alterations and additions can be made in the improved polyester-forming composition of the present invention, its constituents, concentrations and parameters, in the polyester resin formed from the composition, its constituents and parameters and in coil coatings employing the resin. Such modifications, variations, alterations and additions as are within the scope of the appended claims form part of the invention.

What is claimed is:

1. An improved polyester-forming composition for coil coatings, said composition comprising:
   about 43-31 mole % of neopentyl glycol;
   about 10-21 mole % of 1,4-cyclohexanedimethanol;
   about 10-21 mole % of aliphatic dicarboxylic acid selected from the group consisting of adipic acid, sebacic acid, azelaic acid, dodecanedioic acid and mixtures thereof;
   about 22-16 mole % of aromatic acid selected from the group consisting of orthophthalic acid, isophthalic acid and mixtures thereof;
   about 15-11 mole % of terephthalic acid; and, sufficient condensation catalyst to effect substantial esterification and polymerization of said composition at elevated temperature.

2. The improved composition of claim 1 wherein said aliphatic dicarboxylic acid is adipic acid, wherein said aromatic acid is isophthalic acid and wherein said condensation catalyst is dibutyl tin oxide.

3. The improved composition of claim 1 wherein the mole ratio of alcohol to acid is about 1.08-1.13:1.

4. The improved composition of claim 2 wherein the alcohol and acid of said composition have the following weight % concentrations:

| Ingredients | Wt. - % |
| --- | --- |
| Neopentyl Glycol | 33-24 |
| 1,4-Cyclohexanedimethanol | 11-22 |
| Adipic Acid | 11-22 |
| Isophthalic Acid | 27-19 |
| Terephthalic Acid | 18-13 |

5. An improved polyester resin for coil coating compositions, said resin comprising the reaction product of the following reactants:
   about 43-31 mole % of neopentyl glycol;
   about 10-21 mole % of 1,4-cyclohexanedimethanol;
   about 10-21 mole % of aliphatic dicarboxylic acid selected from the group consisting of adipic acid, sebacic acid, azelaic acid, dodecanedioic acid and mixtures thereof;
   about 22-16 mole % of aromatic acid selected from the group consisting of orthophthalic acid, isophthalic acid and mixtures thereof;
   about 15-11 mole % of terephthalic acid; and, sufficient condensation catalyst to effect substantial esterification and polymerization of the reactants at elevated temperature,
   said reactants having been heated to esterification and polymerization temperatures for a time sufficient to provide said resin with an average molecular weight of at least about 5000.

6. The improved polyester resin of claim 5 wherein said aliphatic dicarboxylic acid is adipic acid, wherein said aromatic acid is isophthalic acid and wherein said condensation catalyst is dibutyl tin oxide.

7. The improved polyester resin of claim 5 wherein the mole ratio of alcohol to acid is about 1.08-1.13:1.

8. The improved polyester resin of claim 6 wherein the alcohol and acid components of said composition have the following weight % concentrations:

| Ingredients | Wt. - % |
| --- | --- |
| Neopentyl Glycol | 33-24 |
| 1,4-Cyclohexanedimethanol | 11-22 |
| Adipic Acid | 11-22 |
| Isophthalic Acid | 27-19 |
| Terephthalic Acid | 18-13 |

9. A method of making an improved polyester resin for coil coatings, said method comprising:
   a. mixing together in a reaction zone:
      about 43-31 mole % of neopentyl glycol;
      about 10-21 mole % of 1,4-cyclohexanedimethanol;
      about 10-21 mole % of aliphatic dicarboxylic acid consisting of adipic acid, sebacic acid, azelaic acid, dodecanedioic acid and mixtures thereof;
      about 22-16 mole % of aromatic acid selected from the group consisting of orthophthalic acid, isophthalic acid and mixtures thereof;
      about 15-11 mole % of terephthalic acid; and,
      sufficient condensation catalyst to effect substantial esterification and polymerization of said composition at elevated temperature;

b. heating the resultant mixture to esterification and polymerization temperature at a sufficiently low rate to minimize glycol loss and holding said mixture at said reaction temperature until the resulting polyester resin has an average molecular weight of about 5000–7000;

c. cooling the polyester resin and adding aromatic hydrocarbon solvent thereto to obtain a resin solution of desired viscosity.

10. The method of claim 9 wherein said reaction temperature is about 470° F. and is maintained until the resulting resin has a viscosity of T at 50% solids in ethoxyethanol acetate and an acid value of about 9.9, and wherein the molecular weight of said polyester is approximately 6200.

11. The method of claim 9 wherein said aliphatic dicarboxylic acid is adipic acid, wherein said aromatic acid is isophthalic acid and wherein said condensation catalyst is dibutyl tin oxide.

12. The method of claim 9 wherein the mole ratio of alcohol to acid is about 1.08–1.13:1.

13. The method of claim 11 wherein the alcohol and acid components of said composition have the following weight % concentrations:

| Ingredients | Wt. - % |
| --- | --- |
| Neopentyl Glycol | 33–24 |
| 1,4-Cyclohexanedimethanol | 11–22 |
| Adipic Acid | 11–22 |
| Isophthalic Acid | 27–19 |
| Terephthalic Acid | 18–13 |

* * * * *